United States Patent
Jimenez

(10) Patent No.: US 8,262,172 B2
(45) Date of Patent: Sep. 11, 2012

(54) DERAILMENT CONTROL SYSTEM

(75) Inventor: Miguel Angel Martin Jimenez, Madrid (ES)

(73) Assignee: Ametsis, Ingenieria y Asesoria Tecnica, S.L., Madrid (ES)

( * ) Notice: Subject to any disclaimer, the term of this patent is extended or adjusted under 35 U.S.C. 154(b) by 1160 days.

(21) Appl. No.: 11/913,976

(22) PCT Filed: May 12, 2006

(86) PCT No.: PCT/ES2006/000244
§ 371 (c)(1),
(2), (4) Date: Feb. 8, 2008

(87) PCT Pub. No.: WO2006/120273
PCT Pub. Date: Nov. 16, 2006

(65) Prior Publication Data
US 2008/0190713 A1 Aug. 14, 2008

(30) Foreign Application Priority Data

May 13, 2005 (ES) .................................. 200501165
May 9, 2006 (ES) .................................. 200601181

(51) Int. Cl.
*B60T 17/00* (2006.01)
*B61L 3/00* (2006.01)
(52) U.S. Cl. ................. 303/7; 303/68; 303/69; 303/81; 303/191; 303/132; 246/170
(58) Field of Classification Search ................ 303/68, 303/69, 81, 191, 132, 7; 246/170
See application file for complete search history.

(56) References Cited

U.S. PATENT DOCUMENTS

| 1,352,861 | A | * | 9/1920 | Wright et al. ................. 246/170 |
| 3,930,629 | A | * | 1/1976 | Armstrong et al. ........ 246/169 A |
| 5,188,038 | A | | 2/1993 | Shanley |

FOREIGN PATENT DOCUMENTS

| EP | 0734931 | 10/1996 |
| EP | 1209052 | 5/2002 |
| JP | 55127246 | 10/1980 |
| WO | 0222415 | 3/2002 |

OTHER PUBLICATIONS

International Search Report dated Aug. 7, 2006 for corresponding International Application PCT/ES2006/000244.

* cited by examiner

*Primary Examiner* — Bradley King
*Assistant Examiner* — Mahbubur Rashid
(74) *Attorney, Agent, or Firm* — Katten Muchin Rosenman LLP

(57) ABSTRACT

Derailment control system for railway vehicles that, in addition to detecting and issuing a warning of said derailment, provides control over the brake of the derailed vehicle or vehicles and provides additional emergency braking and/or a warning to the driver's cab, said system having a main unit (1) to which are joined: an inertia sensor or detector (8) designed to detect derailments, an indicator (9) or device responsible for indicating that the derailment control system has been triggered and for keeping the system activated, a stopcock (10) that deactivates the derailment control, and a bottom connection point (11) for testing that makes it possible to simulate a triggering of the system via a threaded eyebolt, facilitating verification of proper operation both during bench testing and when the system is installed on the vehicle (7), and a device (39) situated at the exhaust outlet through which the automatic brake pipe (ABP)(5) is vented when said derailment is detected.

12 Claims, 4 Drawing Sheets

DERAILMENT CONTROL SYSTEM

RELATED APPLICATIONS

This application claims priority to Spanish application P200501165 filed May 13, 2005 and Spanish Application P200601181 filed May 9, 2006.

OBJECT OF THE INVENTION

The present invention relates to a new derailment control system for railway vehicles, which, in addition to detecting said derailment, provides control over the brake of the derailed vehicle or vehicles.

Specifically, the object of the invention is to achieve a derailment control system that prevents the severe damage caused to the vehicle and to the track when said derailment occurs by controlling the brake of the derailed vehicle or vehicles.

In addition to detecting derailments and controlling the brake of the derailed vehicle, a further object of the invention is to enable the system to trigger additional emergency braking in the entire train while informing the driver's cab of said derailment.

BACKGROUND OF THE INVENTION

The problem of derailments in the field of rail transport is, unfortunately, quite frequent, resulting in numerous losses due to the damage caused to the vehicles and tracks and the loss of revenue proportional to the time that elapses until the affected tracks are once again operational and open to traffic.

These serious consequences resulting from the derailment of railway vehicles have made necessary the use of equipment that can quickly detect the derailment of the vehicles with a sufficient degree of reliability and immediately apply the appropriate measures.

To date, these measures have consisted of applying the emergency brake as soon as the derailment was detected, braking the train as quickly as possible and stopping it in order to minimize any effect a derailment might have on persons, goods, vehicles and infrastructures.

Specifically, systems based on an inertia sensor are known in which the sensor is triggered when the derailment is detected, quickly emptying the automatic brake pipe (ABP) and causing the train's emergency brake to be applied, which acts on all the cars, including the one(s) that derailed.

However, these systems have a major drawback, which is the fact that when the brake is applied on all of the vehicles in the train as a result of the derailment of one or several of them, the wheels of all these vehicles remain braked, including those of the derailed ones. This prevents them from rolling, with the disadvantage that when the derailed vehicles move over the ballast and sleepers the wheels can become locked, with dire results, as this may cause other vehicles to derail or even tip over.

Moreover, on certain occasions when a derailment takes place and thus the ABP is opened, the driver or engineman does not notice this until some time afterwards. This can particularly occur on very long trains, which in some cases might be over two kilometers in length, as the drop in pressure in the ABP takes place gradually down the length of the train, starting with the vehicles nearest the derailed one and continuing along the entire pipe. Thus, if the vehicle that derails is at the end of the train, the drop in pressure in the ABP will not take effect in the first vehicles until a certain amount of time has elapsed, during which the train will continue travelling because this circumstance will not have been noticed in the control station, either.

Therefore, this means that the brake is not applied at the same time in all of the vehicles in the train, which results in irregular braking and a more prolonged braking time.

DESCRIPTION OF THE INVENTION

The system described below effectively resolves the disadvantages mentioned, and constitutes an effective and reliable means of detecting derailments and controlling the brake on the derailed cars, thus preventing the severe damage to both the train and the track that would normally occur in this type of situation.

Specifically, this is achieved through a system that can prevent the brake from being applied in the derailed vehicle(s), enabling the wheels of said derailed vehicle(s) to roll over the ballast and sleepers, thus preventing the serious consequences that can result from the wheels being kept braked.

This system can be used in both towed vehicles (wagons and passenger coaches) and self-propelled vehicles, and in both vehicles with two axles and those with bogies, as long as they have automatic pneumatic brakes.

The derailment control system of the present invention is comprised of a main unit that contains the different mechanisms, and of a support member for securing it to the railway vehicle, which serves to secure the device itself and also to secure the automatic brake pipe (ABP) and the brake cylinder pipe (C), all achieved through conventional means that provide the necessary safety and sealing.

The derailment control device has been designed in such a way that it can be installed on all types of railway vehicles, whether newly built or already in service, with no need to make any modifications to the rest of the braking components installed on the vehicle, except the connections to the ABP or C pipes, as the case may call for.

To install this device, an accessible area of the vehicle is necessary, because if the system is actuated—either because of a derailment or accidentally—it must be inspected and, if applicable, reset.

In general terms, the derailment control system has a central unit in which the emergency devices are housed and in which the ABP is vented after the system is triggered; an inertia sensor responsible for detecting derailments and triggering the system; a trigger indicator; and a stopcock which makes it possible to isolate the derailment control system.

The system does not affect service braking, i.e., the brake actuated by the driver will always be applied, regardless of whether the derailment control system of the present invention is installed or not.

However, in the event of a sharp blow caused by a derailment, the inertia sensor of the device is triggered and this opens the ABP, which in turn causes any pressure in the derailed vehicle's brake cylinders to be vented to the atmosphere. Likewise, in the case where there was no longer any pressure in the brake cylinders beforehand, this pressure would not be created.

At the same time, after the device has been triggered, it also causes the trigger indicator to move, requiring it to be manually reset if the system is to become operational again, because until this action is performed, the pressure in the ABP which would enable reactivation of the derailment control and the release of the train brake cannot be restored.

On the other hand, if derailments of other vehicles were to occur during the braking process initiated through the derailment control system of the invention after a derailment, the system on these vehicles would behave in the same way as the one on the first derailed vehicle; thus, if braking had taken place, the air in the brake cylinders of these vehicles would be vented to the atmosphere, and the brakes of these vehicles released.

Therefore, in order to restore the pressure in the ABP, any system(s) that were actuated must be reestablished by manually resetting the trigger indicator of each and every one of the vehicles on which the system was actuated.

In any case, if it were necessary to prevent the derailment control system from operating, this could be achieved quickly and easily by simply operating a stopcock lever, which would block the connection between the brake pipe and the system of the invention.

Another feature of the invention is that it has a testing system which makes it possible to perform functional testing at any time after it has been installed on the vehicle, in order to ensure its operability and effectiveness.

To this end, the system's central unit has a bottom connection point that acts directly on the inertia sensor, which makes it possible to simulate a triggering of the system via a threaded eyebolt, facilitating functional testing both during bench tests and when the system is installed on the vehicle; in the latter case, the reaction of the brake can be tested when the derailment control system of the invention is triggered, both with the brake applied and released, before the vehicle is operated.

Furthermore, in order to activate additional emergency braking in the locomotive (for the entire train) when a derailment is detected, and at the same time send a warning signal to the driver's cab, the aforementioned derailment control system incorporates a device that can open the safety circuit, which will activate the emergency braking and/or a warning in the driver's cab.

This safety circuit is a round-the-train wire that is electrically energized, and to which the train's safety systems, such as, for example, the emergency pull handles installed in the coaches, are connected, so that if the circuit is broken (opened) through the activation of any of these safety systems, emergency braking is applied.

On railway vehicles, there is usually an emergency solenoid valve, which in combination with other devices makes up what is known as the "emergency brake channel". This solenoid valve is connected to the safety circuit, and thus is permanently energized; therefore, if the solenoid valve loses current because the circuit is opened, a series of actions is triggered, including the application of an emergency brake.

Thus, when the device of the invention is actuated, the aforementioned safety circuit is opened, activating braking in addition to the braking caused by the venting of the ABP when the derailment is detected; however, on this occasion, the brake is applied immediately, because unlike the venting of the ABP, which as has already been mentioned is conditioned by the speed at which the pipe is emptied, the application of the emergency brake produces simultaneous braking in all of the vehicles in the train.

To achieve the opening of this circuit, the device of the invention is incorporated on the main unit of the derailment control system, so that it is situated over one of the outlets through which the ABP is vented after the derailment of one or several vehicles has been detected.

This device, whose mechanical structure is simple, basically comprises a piston or element moved by the action of the air released from the ABP, which in the course of its travel actuates at least one microswitch responsible for opening or closing the safety circuit. In the idle position, this microswitch allows electrical continuity in the wire, but when a derailment occurs, and therefore the ABP is vented, the piston or movable element actuates said microswitch, which in turn opens the safety circuit, or in other words, opens the circuit formed by said wire, producing simultaneous braking in the entire train at the same time as it activates a warning signal that is sent to the driver's cab.

DESCRIPTION OF THE DRAWINGS

To complement the description being made and for the purpose of aiding to better understand the features of the invention according to a preferred practical embodiment thereof, a set of drawings is attached as an integral part of said description which shows the following with an illustrative and non-limiting character.

PREFERRED EMBODIMENT OF THE INVENTION

Figure 2:
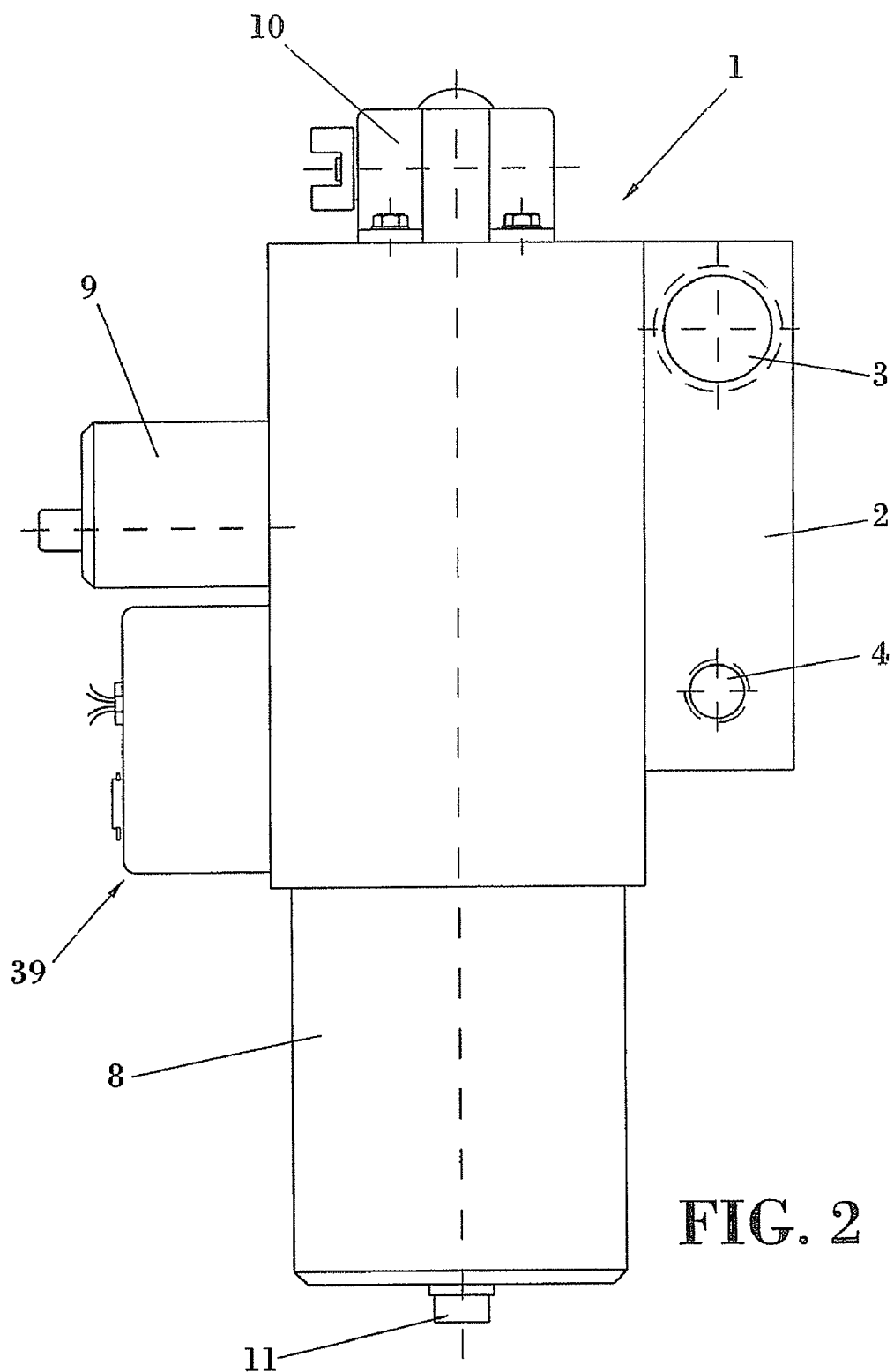
FIG. 2 shows a schematic representation of the system of the invention.

As can be seen in FIG. 2, the derailment control system of the present invention takes the form of a main unit (1) connected to the vehicle (7) through a support member (2) that has two connections, a first one (3) to the ABP (5) and a second one (4) to the brake cylinder pipe (6).

Figure 1:
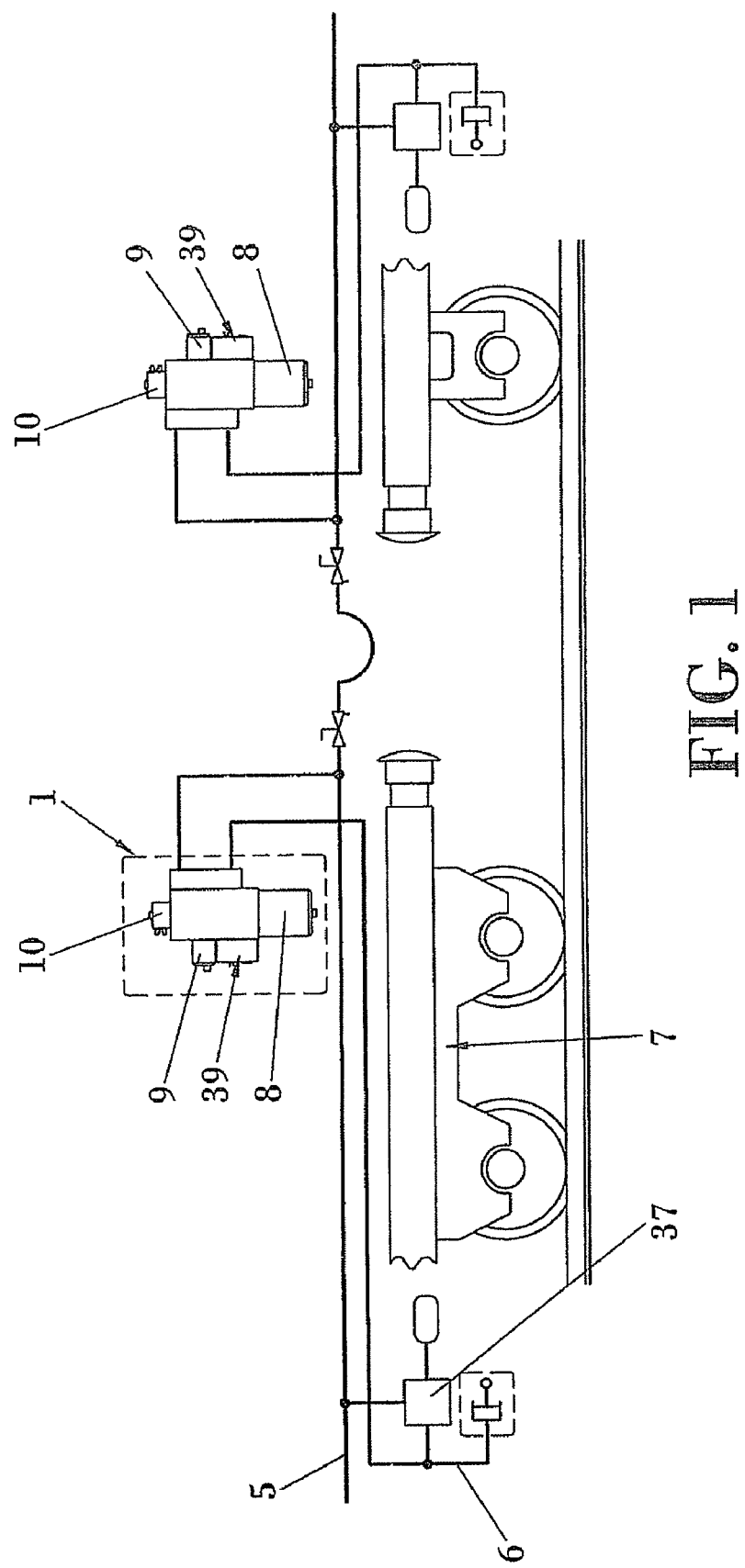
FIG. 1 shows a general schematic representation of the connection of the device of the invention to each vehicle.

An example of the connection of the derailment control system to the vehicle (7) or vehicles can be seen in FIG. 1, in which the route of the ABP (5), which is common to said vehicles, can be followed, and the brake cylinder pipe (6) can also be seen. The connection to the ABP (5) can be either a series or parallel connection.

The following functional devices are, in general terms, also joined to the aforementioned main unit (1) of the derailment control system of the present invention:

Inertia sensor (8) or detector: designed to detect the anomalous vertical accelerations that take place after derailments and to trigger the sensor and the corresponding emergency braking.

Trigger indicator (9) or signal: as its name indicates, it is responsible for indicating the actuation of the derailment control system, and also for making it possible to keep the emergency situation activated (venting of the ABP and brake cylinders); therefore, its location on the system must enable it to be perfectly visible at all times.

Stopcock (10): designed to appropriately isolate the system in the event of any occurrence that would require it to be sealed off or blocked, leaving it out of service and thus deactivating the derailment control, as it blocks the connection between the system and the ABP (5). This stopcock (10) is located on the upper part of the system's main unit (1), and can also be mounted in four different positions, thus facilitating access to the blocking action, regardless of how the system is installed on the vehicle (7).

Furthermore, the incorporation of this stopcock (10) eliminates the need to install an external isolation cock, and also affords easy access on each of the vehicles (7).

Test connection: The system's inertia sensor (8) also has a bottom connection point (11) that makes it possible to simulate a triggering of the device via a threaded eyebolt, facilitating simple and quick functional testing both during bench tests and when the system is installed on the vehicle (7).

This connection facilitates testing to check that the sensor is functioning properly at any time, and especially before the vehicle (7) is operated, which makes it possible to verify not only that the brake system is working properly but also that the derailment control system of the invention is functioning correctly.

Additional emergency braking device (39): located at the exhaust outlet through which the ABP (5) is vented when a derailment is detected.

All of these elements, except for device (39), form an active part of the derailment control process, which will be described below following a possible sequence of operation of the system, at the same time as the operation and characteristics of each of these elements is described.

Figure 3:
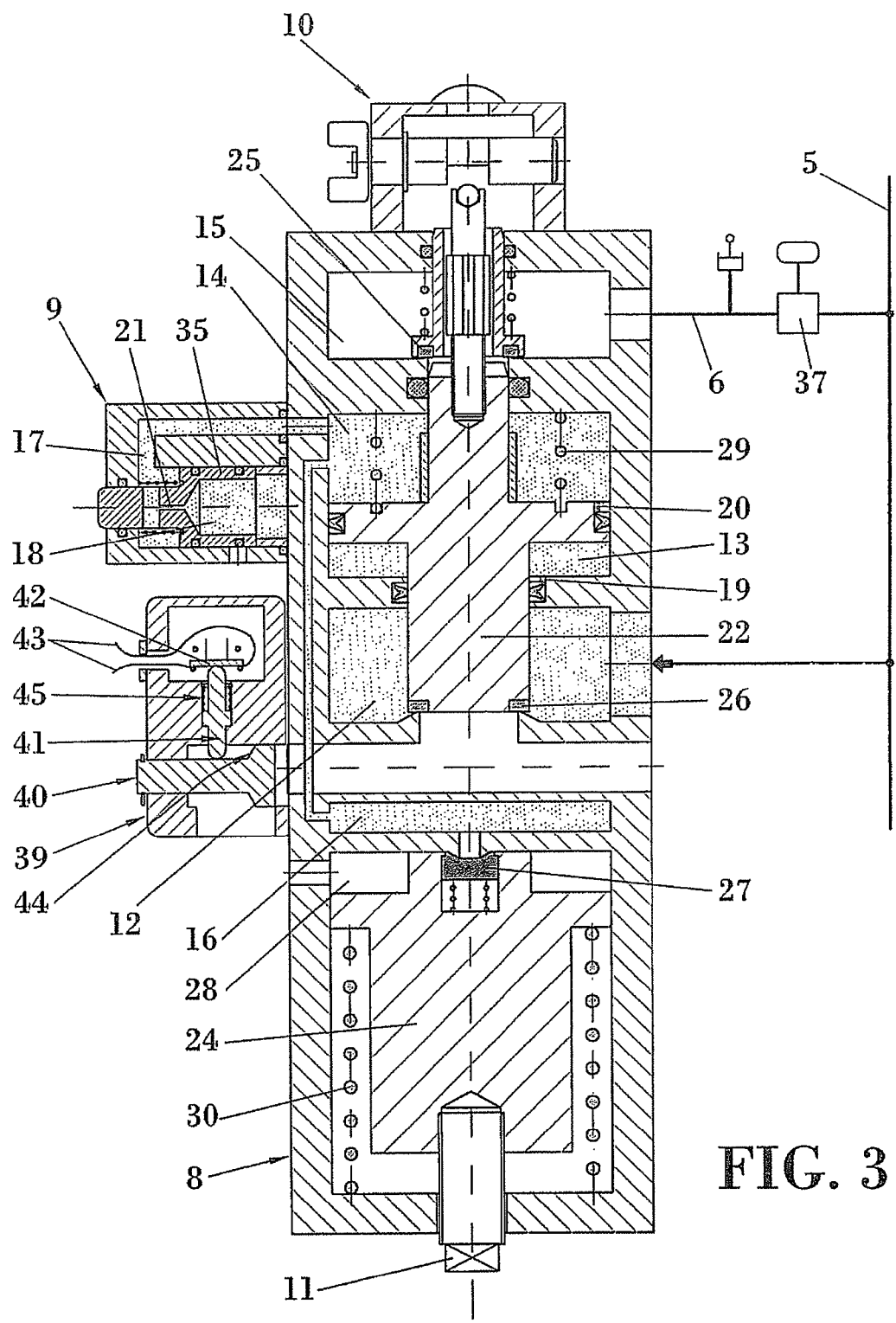
FIG. 3 shows a section view of the system of the invention when said system is idle.

Starting from the idle position shown in FIG. 3, the ABP (5) would be completely empty, as would chambers (12, 13, 14, 16, 17 and 18), which remain at a pressure of 0 bar, during which time the indicator (9) is held inwards in an idle position through the action of the spring (38).

As the pressure in the ABP (5) increases, the air moves into chamber (12) and from there it slowly passes through nozzle (19) under the piston (22) to chamber (13), from which this air goes to chamber (14) through nozzle (20), and from there to chamber (17). Next, it goes through nozzle (21) to chamber (18) of the indicator (9). Likewise, it also goes from chamber (14) to chamber (16) and to the valve (27) in the inertia sensor (8), which remains closed.

While the ABP is being filled, the brake valve (37) continues to act as usual, independently from the process described above.

With regard to the additional emergency braking, in this idle position, as can be seen in the aforementioned FIG. 3, the piston (40) that forms part of device (39) is in a retracted position, so that the rod (41) that rests on it does not act on the microswitch (42) responsible for opening the safety circuit (43); thus, the electrical continuity of said circuit (43) is not interrupted, which means that no additional emergency braking nor any type of signal in the driver's cab will be activated.

The spring (45) is also responsible for maintaining this idle position, preventing the rod (41) from acting on the microswitch (42) in the event of any shaking or abrupt movement that does not cause a derailment, thus ensuring that no undesired emergency braking is triggered.

Furthermore, the system of the invention is also designed so that the filling of the different chambers (13, 14, 16, 17 and 18) with air and the pressure increases in the said chambers through the different nozzles (19, 20 and 21) is independent of the speed at which the ABP (5) is filled, thus ensuring that the system will function properly regardless of the length of the train and therefore of said ABP.

Afterwards, during normal operation, the brake of the vehicle (7) can be applied and released, i.e., the service brake controlled by the ABP (5) and actuated by the driver can be used, and the brake will be applied in all of the vehicles where it is active. However, the derailment control system of the invention has no influence on this operation, in that valves 25, 26 and 27 remain closed and the pressure in chambers 13 to 18 is not altered during the process, while chamber (12) is emptied and filled along with the ABP.

Likewise, when fast braking takes place because of the application of some other type of complementary braking, such as, for example, an emergency brake, which would produce an abrupt drop in pressure in the ABP (5), the control system of the present invention would once again have no effect or influence on the braking process.

Conversely, when one or several vehicles (7) derail(s), the control system of the invention would act as follows:

In the event of a sharp blow caused by a derailment, the body of the piston (24) in the system's inertia sensor (8) moves downwards, and with this action chamber (16) connects to chamber (28) through valve (27), and the latter chamber connects to the atmosphere through the exhaust (33), which causes an abrupt drop in pressure in said chamber (16) as well as in chambers (14, 17 and 18), creating an abrupt variation in pressure between chamber (14) and chamber (13); this makes the piston (22) move upwards, overcoming the force of the spring (29) and causing valves (25) and (26) to open.

This opening of valves (25) and (26) is essential to the object of the invention, which is the venting of the brake cylinder (6) to thus enable the wheels of the derailed vehicle(s) to roll.

To achieve this venting of the brake cylinder (6), it was decided, from among the possible embodiments, to provide the piston (22) with the seat of valve (26) on one side and the seat of valve (25) on the other, so that the opening of valve (26), which causes the venting of the ABP through the exhaust (31), entails the opening of valve (25), thus causing the venting of the brake cylinder pipe (6) through exhausts (32) and (36).

Nevertheless, if one wishes to prevent the derailment control of the invention from acting, i.e., if the release of the brake cylinder (6) of the derailed vehicle(s) is not desired, it would be sufficient to refrain from connecting said brake cylinder pipe (6) to the entrance to chamber (15), thus cancelling the effect of the system.

With regard to the additional emergency braking, it is a fact that, as mentioned earlier, the opening of valve (26) causes a quick drop in pressure in the ABP (5) as its pressure is released to the atmosphere via exhaust (31), which in turn causes piston (40), situated at the exit of said exhaust (31), to move.

Figure 4:
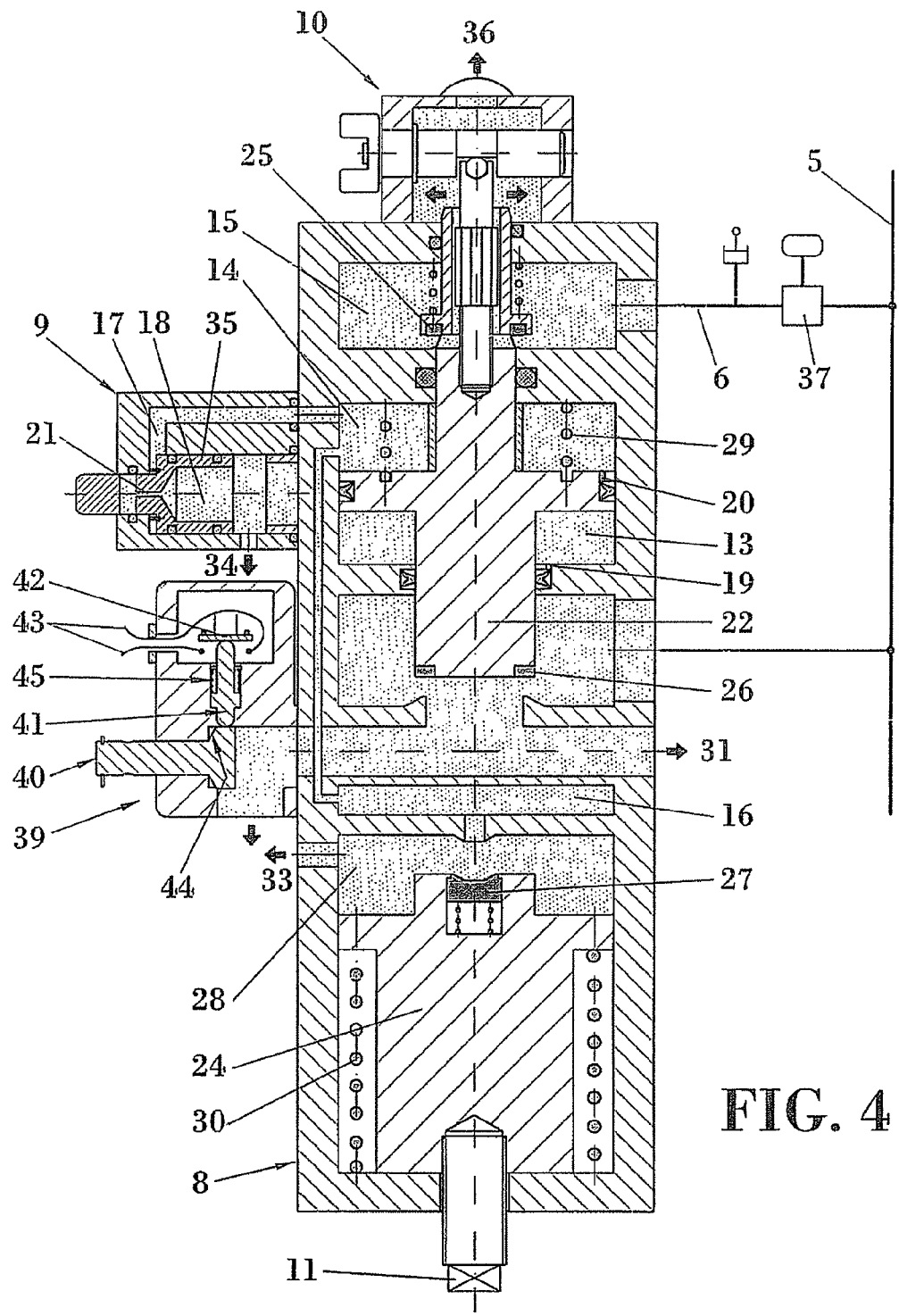
FIG. 4 shows a section view of the system of the invention when said system has been triggered.

In turn, the movement of the piston (40), overcoming the resistance of the spring (45), causes the rod (41) to rise, with the assistance of the sloping section (44). Thus, the rod (41) acts on the microswitch (42), opening the safety circuit (43), as can be seen in FIG. 4, thus interrupting the electrical continuity of the aforementioned circuit, which triggers additional emergency braking and/or a signal in the driver's cab.

Continuing with the process of how the derailment control system operates, the air in chamber (16) then goes through valve (27) and moves to the top of piston (24) in the inertia sensor (8), in chamber (28). As shown in FIG. 4, as soon as valve (27) opens, the pressure in chamber (16) falls abruptly towards chamber (28), and from said chamber (28), the air is released to the atmosphere via outlet (33).

Because of all of the above, valve (27) opens after a derailment or after the inertia sensor (8) acts, producing a sharp drop in pressure in chambers (16, 14 and 17). This abrupt drop in pressure in chamber (17) produces a difference in pressure between this chamber (17) and chamber (18), which causes piston (35) in the indicator (9) to move outwards, and said chamber (18) to become connected to the atmosphere via outlet (34) through the effect of this movement.

This outward position of piston (35) in the indicator (9) is maintained until the piston is reset. In other words, the piston (35) of the indicator (9) must be reset manually to return said indicator to its initial position, which means that a technician or other qualified person must perform in situ inspection or verification.

Therefore, as long as the piston (35) is pushed outwards, chambers (14, 16, 17 and 18) will be connected to the atmosphere through outlet (34).

In this position, if the ABP (5) were to fill up for any reason, even if valve (26) were closed because of the action of the spring (29), after a short time said valve (26) would open up, as the increase in pressure in chamber (13) through nozzle (19) and the lack of pressure in chamber (14) would produce a difference in pressure between the lower and upper surface of piston (22), which would entail the opening of said valve (26) and a drop in pressure in the ABP (5) once again.

Therefore, as has been described, any derailment control systems that have been triggered will have to be reset so that the pressure in the ABP (5) can be restored; to this end, the piston (35) in the indicator (9) must be moved inwards, thus closing off the outlet (34).

Furthermore, if, after a derailment is detected, valve (27) were to close because of the action of spring (30) and this enabled the device to be reset, pressure would not be allowed to be created over the piston (22), as chamber (14) is connected to the atmosphere through chambers (17) and (18), while conversely, there would be an increase in pressure in chamber (13), which would keep valves (25) and (26) open, thus preventing the formation of pressure in both the brake pipe (6) and in the ABP (5), and with it the resetting of the brake.

This characteristic configuration of the derailment control system of the present invention means that if derailments of other vehicles were to occur during the braking process initiated after the derailment of one vehicle (7), the control system on these vehicles would behave in the same way as the one on the first derailed vehicle (7); thus, if braking were to take place, the air in the brake cylinders of these vehicles would be vented to the atmosphere, releasing the brakes of these vehicles and thus preventing damage to both the tracks and to the vehicles themselves.

Therefore, as can be inferred from the above description, the derailment control system(s) on any vehicles (7) on which said systems were triggered must be reset in order to restore pressure in the ABP (5); to this end, the indicator (9) must be reset by manually moving the piston (35) inwards, thus closing off the outlet (34) and enabling the system to be reset.

Likewise, in device (39), once the emergency situation has passed, the piston (40) will go back to its initial position through the intervention of a worker, who will manually reset it; thus, the rod (41) will go down and will no longer act on the microswitch (42), which will once again close the safety circuit (43), leaving the device (39) of the invention ready to act again.

The invention claimed is:

1. A derailment control system for a railway vehicle having an inertia sensor to detect derailment, which in the event of a sharp blow caused by a derailment acts on an automatic brake pipe triggering the application of a train's emergency brake, the system comprising:
   means for emptying a brake cylinder pipe on the vehicle when derailed to-release the brake and, thus, enabling wheels of the derailed vehicle to roll; and
   a device situated at the exhaust outlet through which the automatic brake pipe is vented when a derailment is detected, which provides an additional simultaneous braking on the entire train or a warning signal to a driver's cab, wherein the device comprises a device piston moved by the action of air released from the automatic brake pipe through the exhaust, which in the course of said device piston travel causes the closing or opening of a microswitch responsible for opening and closing a safety circuit.

2. The derailment control system of claim 1, wherein the means for emptying the brake cylinder pipe comprises a piston having a second valve in addition to a first vale through which the venting of the automatic brake pipe takes place, so that when a derailment occurs and the piston moves upwards, overcoming the force of a spring, an opening of the first valve also entails opening of the second valve and, thus, venting of the brake pipe through first and second exhausts.

3. The derailment control system of claim 1 further comprising an indicator comprising an indicator piston which moves outwards after the inertia sensor has acted.

4. The derailment control system of claim 3, wherein when the indicator piston moves outwards, chambers will be connected to an ambient atmosphere through an outlet, and therefore, pressure cannot be restored to the automatic brake pipe until the indicator piston has been reset.

5. The derailment control system of claim 4, wherein the indicator piston must be reset manually in order to return said indicator to its initial position, which will close off the outlet.

6. The derailment control system of claim 1 further comprising an easily accessible stopcock on the vehicle, which when operated isolates the derailment control system, and blocks a connection with the automatic brake pipe and for leaving the derailment control system out of service and deactivated, and eliminating a need to install an external isolation cock, as well as affording easy access to the vehicle.

7. The derailment control system of claim 6, characterized in that the stopcock can be mounted in four different positions for facilitating blocking, regardless of how the system is installed on the vehicle.

8. The derailment control system of claim 1, wherein the inertia sensor comprises a bottom connection point for simulating triggering the inertia sensor via a threaded eyebolt, facilitating functional testing that makes it possible to verify that the brake system and the derailment control system are working properly, both during bench testing and when the system is installed on the vehicle.

9. The derailment control system of claim 1, wherein the device piston acts on the microswitch through a rod that rests on said device piston.

10. The derailment control system of claim 9, characterized in that the device piston comprises a sloping section that enables the rod to rise and to act on the microswitch.

11. The derailment control system of claim 1, wherein the rod comprises a spring for preventing the rod from acting on the microswitch in idle position if any abrupt movement or shaking that does not involve a derailment occurs.

12. The derailment control system of claim 1, wherein the derailment control system is prevented from acting by refraining from connecting said brake cylinder pipe to a entrance to a chamber.

* * * * *